United States Patent [19]
Hardy et al.

[11] Patent Number: 5,355,969
[45] Date of Patent: Oct. 18, 1994

[54] COMPOSITE POLYCRYSTALLINE CUTTING ELEMENT WITH IMPROVED FRACTURE AND DELAMINATION RESISTANCE

[75] Inventors: John W. Hardy; Bill J. Pope, both of Provo; Kevin G. Graham, Payson; Robert J. Farr, Orem, all of Utah

[73] Assignee: U.S. Synthetic Corporation, Provo, Utah

[21] Appl. No.: 36,540

[22] Filed: Mar. 22, 1993

[51] Int. Cl.⁵ ............................................. E21B 10/46
[52] U.S. Cl. ................................... 175/432; 76/108.2
[58] Field of Search ............... 175/428, 432; 76/108.2, 76/108.4

[56] References Cited

U.S. PATENT DOCUMENTS

| | | | |
|---|---|---|---|
| Re. 32,380 | 3/1987 | Wentorf, Jr. et al. | 407/119 |
| 4,592,433 | 6/1986 | Dennis | 175/329 |
| 4,604,106 | 8/1986 | Hall et al. | 51/293 |
| 4,716,975 | 1/1988 | Dennis | 175/329 |
| 4,784,023 | 11/1988 | Dennis | 175/428 X |
| 5,007,207 | 4/1991 | Phaal | 175/428 X |
| 5,011,509 | 4/1991 | Frushour | 51/293 |
| 5,011,515 | 4/1991 | Frushour | 51/307 |
| 5,032,147 | 7/1991 | Frushour | 51/309 |
| 5,049,164 | 9/1991 | Horton et al. | 51/295 |
| 5,120,327 | 6/1992 | Dennis | 51/293 |

*Primary Examiner*—William P. Neuder
*Attorney, Agent, or Firm*—Thorpe, North & Western

[57] ABSTRACT

A cutting implement formed from a substrate of carbide, or other hard substance, bonded to a polycrystalline layer which serves as the cutting portion of the implement. The interface between the substrate and polycrystalline layer is defined by surface topography with radially spaced-apart protuberances and depressions forming smooth transitional surfaces.

15 Claims, 3 Drawing Sheets

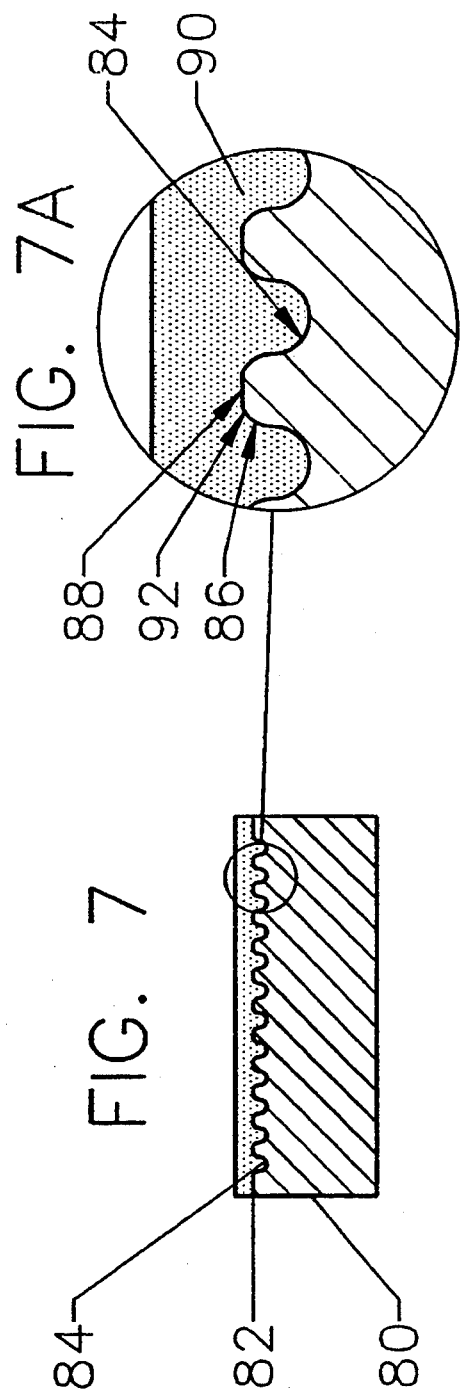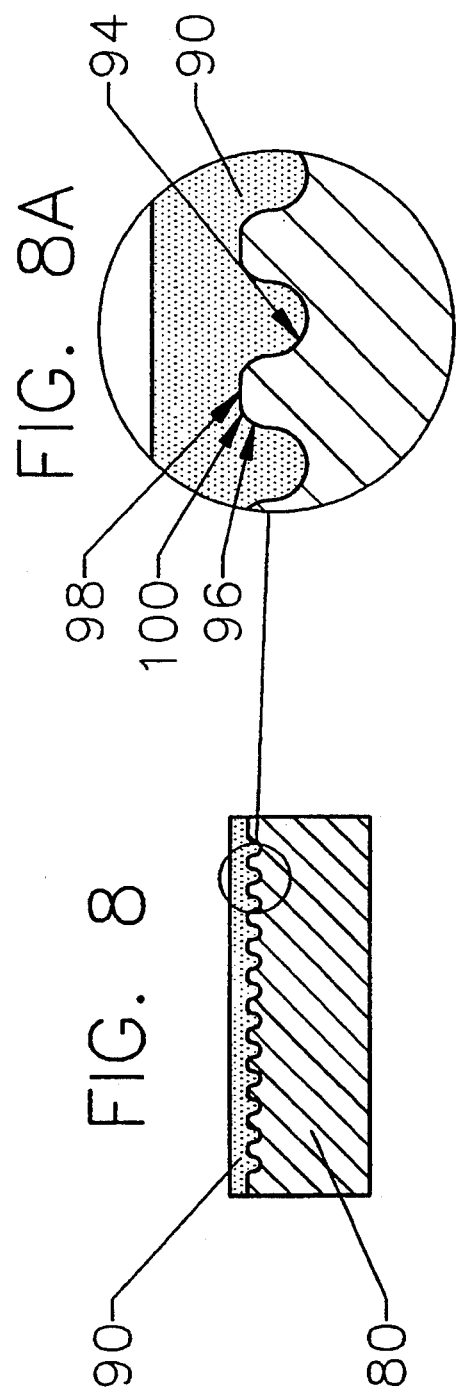

COMPOSITE POLYCRYSTALLINE CUTTING ELEMENT WITH IMPROVED FRACTURE AND DELAMINATION RESISTANCE

BACKGROUND OF THE INVENTION

This invention relates generally to wear and impact resistant bodies for use in industrial applications such as subterranean drilling, and cutting or machining of hard substances. More specifically, the invention provides improvements in mounting or bonding layers of superhard material to support substrates. When the superhard material is diamond the resulting bodies are generally known as polycrystalline sintered diamond compacts or PCD's.

In the following disclosure the term polycrystalline material refers to any of the superhard abrasive materials created by subjecting a mass of individual crystals to high pressure and temperature processes or to chemical vapor deposition processes such that intercrystalline bonding occurs. One class of these materials is generally referred to in the art as sintered diamond. Superhard abrasive materials include, but are not limited to, synthetic or natural diamond, cubic boron nitride, and wurtzite boron nitride, as well as combinations thereof.

These hard polycrystalline materials have been long recognized for their usefulness in cutting and drilling applications. Nevertheless, a cutting or drilling tool made entirely of polycrystalline materials is neither desirable nor practicable because the superhard polycrystalline material is relatively expensive and has relatively low impact resistance due to the high modulus of elasticity of its individual crystals. It is desirable to laminate polycrystalline materials to more impact resistant substrates.

It has long been known that polycrystalline materials can be bonded to a metallic substrate forming a compact, as shown in U.S. Pat. No. 3,745,623. This is often accomplished by sintering the polycrystalline material directly onto a precemented substrate of tungsten carbide by means of high pressure and temperature. This bonding can be accomplished with the same high pressure and temperature cycles used to create the polycrystalline material from separate crystals. An advantage of high temperature and pressure cycling in which the polycrystalline material is created by sintering and simultaneously bonding to the substrate, is that the catalyst/binder, such as cobalt, from the substrate "sweeps" through the polycrystalline material during the process effectively catalyzing the sintering process.

The substrate is bonded to the polycrystalline material under temperature conditions in excess of about 1,300° C. Because of the differences in the coefficients of thermal expansion of the materials, when the compact cools, the substrate shrinks more than the polycrystalline material layer. This can create stress at the transition layer between the substrate and the polycrystalline material which can reduce the effective strength of the bond. Obviously, if the bond between the polycrystalline material and the substrate fails, the utility of the compact is lost. Such a failure may necessitate re-tooling, and thus added expense, especially in the case of deep-well and off-shore drilling applications.

Stress between the substrate and the polycrystalline material may cause fractures in the polycrystalline material, or delamination from the substrate during cooling, during attachment to a tool, or during use. In-use failures are often brought about by impact forces that release stress in the form of fractures in the compact. Ultimately, fractures lead to fracturing of the polycrystalline material, separation or delamination of the polycrystalline material from the substrate material, as well as fracture of the substrate. All of the failure modes are likely to lead to instability, and, ultimately, complete failure of the compact.

A number of configurations have been proposed to overcome the problems of stress in the compact due to thermal expansion. Some configurations suggest the use of three dimensional surface irregularities. These configurations, however have failed to suggest a way to prevent the concentration of residual stress on the critical points such as the intersections of planes.

Other configurations, particularly the configurations disclosed in U.S. Pat. No. 4,604,106, suggest that pieces of substrate material be mixed with the polycrystalline material near the transition layer prior to high pressure and temperature cycles. This is supposedly done to try to suspend the consequences of a single transitional plane. In this configuration, cobalt mixed with the polycrystalline material prevents cobalt from the substrate from cleanly sweeping impurities out of the polycrystalline material during high pressure and temperature cycles. The remaining impurities cause weak spots that can cause the part to fail.

SUMMARY OF THE INVENTION

It is an object of the invention to provide a composite polycrystalline cutting element including a substrate with improved fracture and delamination resistance.

It is another object of the invention to provide a composite polycrystalline cutting element with increased area at the transition between the substrate and the polycrystalline material, without unduly concentrating stress into critical areas, a benefit to both the polycrystalline material and its substrate.

It is a further object of the invention to provide a composite polycrystalline cutting element which will better accommodate stresses created by differing coefficients of thermal expansion between the substrate and polycrystalline material.

It is also an object of the invention to provide a composite polycrystalline cutting element with relatively uniform directional sheer strength and cutting ability regardless of its orientation in a tool.

Additional objects and advantages of the invention will be set forth in or apparent from the description which follows. The above and other objects of the invention may be realized in a specific illustrative embodiment of a composite polycrystalline cutting element which includes a substrate having a support surface with radially spaced-apart alternating channels and ridges. Also included is a layer of polycrystalline material with a cutting surface and an opposed mounting surface with the mounting surface having channels and ridges which are complementary to and in contact with the channels and ridges of the support surface. The ridges and channels may be formed concentrically, or by an outwardly spiralling single ridge and channel pair.

Alternatively, radially, and circumferentially spaced-apart nipples (or dimples) may be formed in the substrate support surface, with a dimple (or nipple) being formed in the mounting surface of the polycrystalline material layer.

Configurations with surface irregularities potentially have greater sheer strength (the ability to resist lateral forces) when installed in one direction, as opposed to another. For example, if the irregularities run parallel to each other, the sheer strength will be greater when the direction of the irregularities is perpendicular to the direction of travel of the composite, and the sheer strength will be minimal when the direction of the irregularities is parallel to the direction of travel of the composite. Great care must be taken to determine the relative sheer strength, mark it for the installing technician, install the composite in the optimum orientation, and use the tool in the intended direction of travel. These problems are alleviated by arranging surface irregularities as will be described for the present invention.

BRIEF DESCRIPTION OF THE DRAWINGS

The above and other objects of the invention will become apparent from a consideration of the following detailed description presented in connection with the accompanying drawings in which:

FIG. 7 is a side, cross-sectional view of yet a further embodiment of a composite polycrystalline cutting element made in accordance with the principles of the present invention.

FIG. 8 is a side, cross-sectional view of still a further embodiment of a composite polycrystalline cutting element made in accordance with the principles of the present invention.

DETAILED DESCRIPTION

Figure 1:
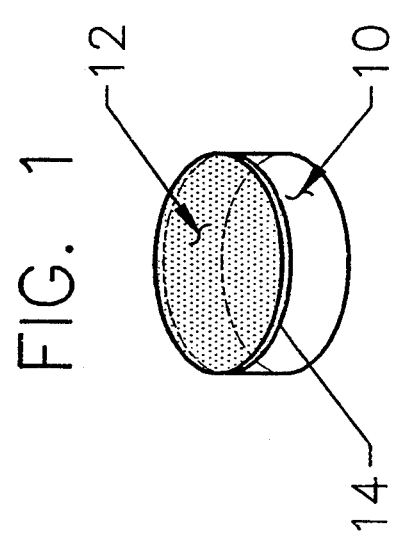
FIG. 1 is a perspective, phantom view illustrating an example of a prior art composite polycrystalline cutting element.

Turning now to the drawings, FIG. 1 illustrates a prior art composite polycrystalline cutting element which is made up of a carbide substrate 10 supporting a layer of polycrystalline material 12. See, for example, U.S. Pat. No. 3,745,623. The substrate 10 is bonded to the layer of polycrystalline material 12 at the interface 14. The bond at the interface 14 between the substrate 10, and the polycrystalline layer 12, is formed during high pressure and temperature cycles. After heating and during cooling of such compacts, the substrate 10 shrinks more than the polycrystalline layer 12 because of differences in the respective coefficients of thermal expansion. This creates tremendous stress at the interface 14, which may lead to fracturing of the polycrystalline layer 12, separation or delamination of the polycrystalline layer 12 from the substrate 10, as well as fracture of the substrate.

Figure 2:
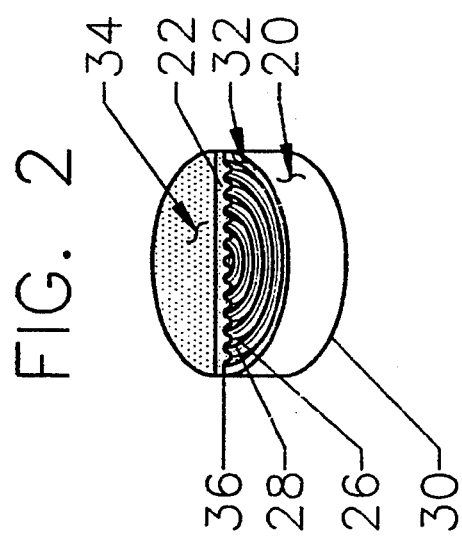
FIG. 2 is a perspective partially cutaway view of one embodiment of a composite polycrystalline cutting element made in accordance with the principles of the present invention.
Figure 3A:
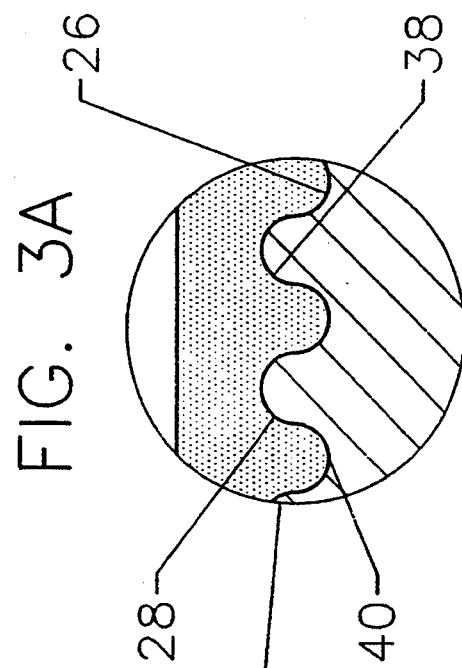
FIG. 3 is a side, cross-sectional view of the composite polycrystalline cutting element of FIG. 2.
Figure 3:
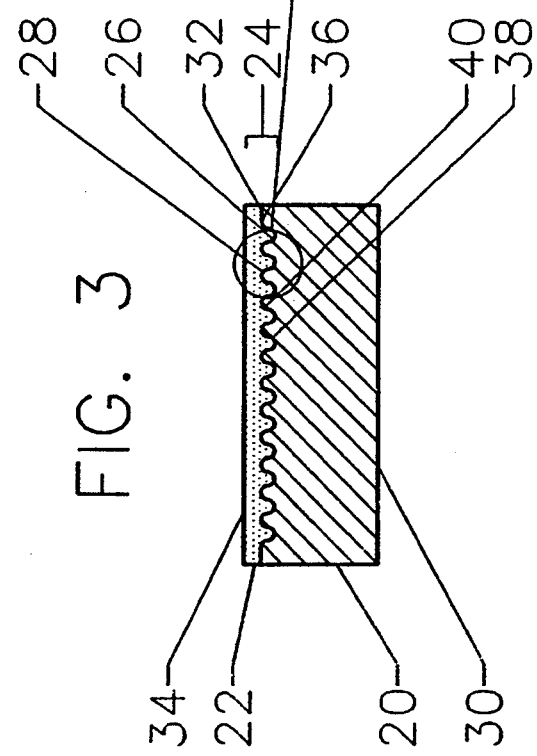

Referring to FIGS. 2 and 3, there is shown one illustrative embodiment of a composite polycrystalline cutting element made in accordance with the principles of the present invention. The cutting element is comprised of a substrate 20 on which is disposed a polycrystalline material layer 22. The substrate 20 in the preferred embodiment is formed of a cemented carbide.

The substrate 20 is of cylindrical shape and comprises a lower surface 30 which is adapted to being attached to a tool by means of brazing, mechanical interface, or other techniques well known in the art, and a support surface 32 which is formed with radially spaced-apart, alternating channels 26 and ridges 28. The polycrystalline material layer 22 includes a cutting surface 34, and an opposed mounting surface 36. The mounting surface 36 is formed with alternating channels 38 and ridges 40 (FIG. 3) which are complementary with the channels 26 ridges 28 of the support surface 32 of the substrate 20.

A transition area 24 between the substrate 20 and the polycrystalline material layer 22 is defined by the alternating channels 26 and ridges 28 (FIG. 3). The width of the transition area 24 is defined by the depth of the channels 26, and the height of the ridges 28.

The composite may be manufactured, in the preferred embodiment, by fabricating a cemented carbide substrate 20 in a generally cylindrical shape. The channels 26 and ridges 28 are formed in the support surface 32 by any suitable cutting, grinding, stamping, or etching process. A sufficient mass of polycrystalline material is then placed on the substrate 20. The mass of polycrystalline material must be sufficient to fill the channels 26 and cover the ridges 28 during and after the fabricating process. The substrate 20 is then placed in a press. The polycrystalline material and the substrate 20 are subjected to pressures and temperatures sufficient to effect intercrystalline bonding in the polycrystalline material, and create a solid polycrystalline material layer 22. The pressures and temperatures must also be sufficient to formulate channels 38 and ridges 40 on the mounting surface 36 of the polycrystalline material layer 22, which are complementary to and in contact with the ridges 28 and channels 26 of the substrate 20. Pressures, temperatures, and apparatus for bonding a substrate with a polycrystalline material are known in the prior art and are described in, for example, U.S. Pat. Nos. 3,745,623; 3,767,371; and, 3,913,280.

Chemical vapor deposition may also be used to deposit the polycrystalline material on the substrate 20. This is accomplished by coating the particles of the individual diamond crystals with various metals such as tungsten, tantalum, niobium, or molybdenum, and the like by chemical vapor techniques using fluidized bed procedure. See U.S. Pat. Nos. 3,871,840 and 3,841,852. Chemical vapor deposition techniques are also known in the art which utilize plasma assisted or heated filament methods.

During high pressure and temperature cycles, the crystals of the polycrystalline material come closer and closer together. Ideally, all space between the crystals would be eliminated to form a uniform and solid crystal mass. One limitation on the ideal is that bridging may occur between crystals in a line between the pressure source and the substrate 20. Surface deformities can amplify this problem by reducing the distance of compaction between the highest point on the deformities and the pressure source. The effect of bridging in the present preferred embodiment is reduced if the distance between the ridges 28 is greater than the average width of the individual crystals so that the crystals can be compacted into the channels 26.

During high pressure and temperature cycles, cobalt from the substrate diffuses through the polycrystalline material. The presence of the binder metal facilitates intercrystalline bonding, and clears impurities from the polycrystalline material.

As the composite cools, the differences in the coefficients of thermal expansion of the various materials, creates stress between the substrate 20 and the polycrystalline material layer 22. In the present invention, this stress is distributed over a larger interface surface area (between the substrate and polycrystalline layer) than in prior art with a planar interface or transition area. The present invention avoids critical concentrations of stress in the transition area 24 (FIG. 3), by eliminating the presence of convergent planes in the transition area which form either a line, or even a single point, of convergence. Any surface irregularities will concentrate stress which would normally, in a configuration such as that in the FIG. 1, be spread across a plane. For example if the substrate has a ridge with a planar surface which is parallel to the rest of the substrate surface, and sidewalls of the ridge which were perpendicular to the top of the ridge, stress would be concentrated at the intersections of the sidewalls and the ridge. Even worse, if the substrate has pyramidal surface irregularities, both impact induced and thermally induced stress concentrates at the peaks of the pyramids.

It will also be appreciated that a graduated transition area 24 as in the present invention, distributes thermally induced stress more effectively in a third dimension than does a transition area that exists in a single plane.

In the embodiment of the present invention described above, there are an infinite number of lines of symmetry extending through the center of the support surface 32 of the substrate 20. This is significant because thermal expansion projects radially outward from, and contracts inward to, an axis at the center of the support surface 32 of the substrate 20. Because the number of lines of symmetry are infinite, stress cannot concentrate between points on adjacent radii, but are distributed circumferentially and evenly.

The maximum height of the ridges 28 reduces the minimum depth of the polycrystalline layer 22. The apex of the ridges 28 may also serve as point of stress concentration for stresses created by impact resulting from working a tool containing the compact. For this reason, it may be desirable to increase the minimum depth of the polycrystalline layer in the present embodiment by flattening the tops of the ridges 28. It may also be desirable to flatten the tops of the ridges to eliminate lines of convergence of the curved sides or apices on the ridges 28. To avoid points of stress concentration between the planes created by flattening the tops of the ridges 28, and the sidewalls between the ridges 28 and the channels 26, the intersection between the two should be rounded. Doing so will naturally create radii of curvature of the rounded corners which are smaller than the radii of curvature of the previously flattened ridges 28.

Figure 4:
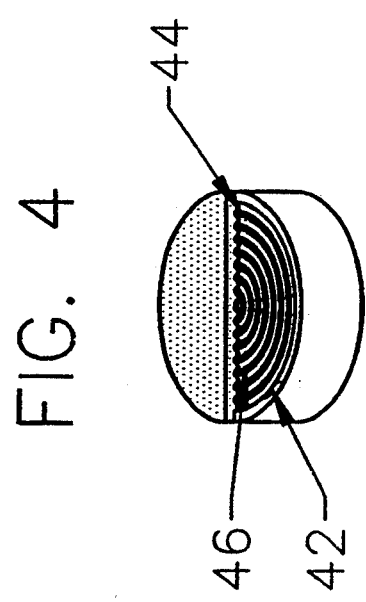
FIG. 4 is a perspective partially cutaway view of another embodiment of a composite polycrystalline cutting element made in accordance with the principles of the present invention.

Referring to FIG. 4, there is shown another illustrative embodiment of a composite polycrystalline cutting element made in accordance with the principles of the present invention, wherein the channels 44 and ridges 46 of the support surface 42, are arranged in a spiral which radiates outwardly from a central axis. This embodiment has the advantage of minimizing any areas of stress concentration between points on adjacent radii, thereby maximizing symmetry between points on adjacent radii.

Figure 5:
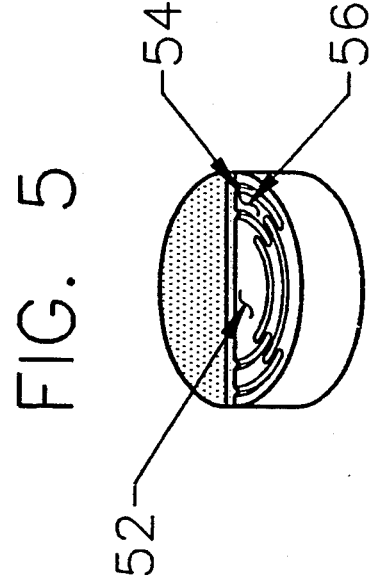
FIG. 5 is a perspective partially cutaway view of yet a another embodiment of a composite polycrystalline cutting element made in accordance with the principles of the present invention.

Referring to FIG. 5, there is shown yet another illustrative embodiment of a composite polycrystalline cutting element made in accordance with the principles of the present invention, wherein the channels 54 and ridges 56 of the support surface 52, are arranged in a segmented arcuate manner about the central axis.

Figure 6:
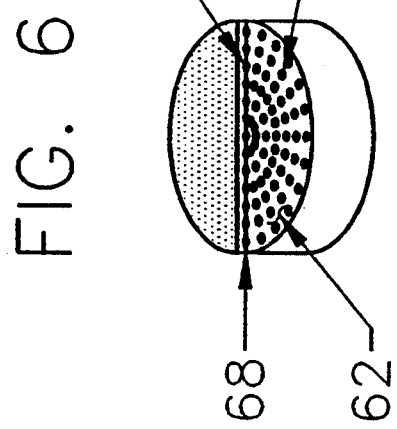
FIG. 6 is a perspective partially cutaway view of an additional embodiment of a composite polycrystalline cutting element made in accordance with the principles of the present invention.

Referring to FIG. 6, there is shown an additional illustrative embodiment of a composite polycrystalline cutting element made in accordance with the principles of the present invention, with convex spherical protuberances or nipples 66 projecting from the support surface 62. The protuberances or nipples 66 are arranged so that they exist on each of a several radially spaced-apart circumferential loci. The protuberances or nipples 66 of the support surface 62 correspond to concave spherical depressions or dimples in the mounting surface 68 of the polycrystalline layer 64, which depressions or dimples correspond to, and are in intimate contact with the protuberances or nipples 66 of the support surface 62.

Referring to FIG. 7, there is shown yet a further illustrative embodiment of a composite polycrystalline cutting element made in accordance with the principles of the present invention, with concave channels 84 in the support surface 82 of the substrate 80. The sidewalls 86 between the channels and ridges 88 are formed with a continuous curve. The tops of the ridges 88 are flattened.

The maximum height of the ridges 88 defines the minimum depth of the polycrystalline layer 90. The apex of continuously curved ridges may also serve as point of stress concentration for stresses created by impact resulting from working a tool containing the compact. For this reason, it may be desirable to increase the minimum depth of the polycrystalline layer in the present embodiment by flattening the tops of the ridges 88. It may also be desirable to flatten the tops of the ridges to eliminate lines of convergence of the curved sides or apices of curved ridges.

Referring to FIG. 8, there is shown still a further illustrative embodiment of a composite polycrystalline cutting element made in accordance with the principles of the present invention, with flattened tops of ridges 98, curved sidewalls and concave bottoms of the channels, 94. The lines of convergence (92 of FIG. 7) of the planes created by the flattened tops of the ridges 98 and the sidewalls 96, are rounded 100 with a radius of less than the radius of the un-flattened ridge top (28 of FIG. 3). This eliminates the relatively harsh transition (90 of FIG. 7) created by flattening the tops of the ridges to increase the minimum depth of the polycrystalline layer and or eliminate an apex on the ridge.

It is to be understood that the above-described arrangements are only illustrative of an application of the present invention. Numerous modifications and alternative arrangements may be devised by those skilled in the art without departing from the spirit and scope of the present invention and the appended claims are intended to cover such modifications and arrangements.

What is claimed is:

1. A cutting element comprising:

a substrate having a support surface formed with alternating protuberances and depressions spaced-apart in a radial direction from the center wherein the bottoms of the depressions are concave, and a polycrystalline material layer having a cutting surface and an opposed mounting surface, the mounting surface having depressions and protuberances complementary to and in contact with the protuberances and depressions of the support surface, said mounting surface being joined to the said support surface.

2. A cutting element as in claim 1 wherein the tops of the protuberances are convex, and having non-planar sidewalls between the protuberances and depressions.

3. A cutting element as in claim 2 wherein the tops of the protuberances are flattened.

4. A cutting element as in claim 3 wherein intersections between the flattened tops of the protuberances and the sidewalls are curved with radii of curvature smaller than the radii of curvature of the original protuberances.

5. A cutting element as in claim 1 wherein the protuberances comprise ridges arcuately formed about the center, and wherein the depressions comprise channels arcuately formed about the center.

6. A cutting element as in claim 4 wherein the ridges and channels are formed concentrically.

7. A cutting element as in claim 4 wherein the ridges and channels spiral outwardly from the center.

8. A cutting element as in claim 1 wherein the protuberances comprise nipples arcuately disposed about the center, and wherein the depressions comprise dimples arcuately disposed about the center.

9. A cutting element as in claim 1 wherein the protuberances comprise nipples concentrically disposed about the center, and wherein the depressions comprise dimples concentrically disposed about the center.

10. A cutting element as in claim 1 wherein the protuberances and depressions are spaced-apart radially by a distance from the apex of any protuberance to the nadir of the nearest depression, the distance being no less than an average sized individual crystal of the polycrystalline layer prior to sintering.

11. A cutting element as in claim 1 wherein the protuberances and depressions are spaced-apart radially by a distance from the apex of any protuberance to the nadir of the nearest depression of no greater than 5 millimeters.

12. A cutting element comprising:

a substrate having a perimeter, a central axis, and a support surface, wherein the support surface is formed with alternating upwardly and downwardly projecting deformities spaced apart at intervals between the central axis and the perimeter;

said upwardly projecting deformities having tops and sides having intersections therebetween which form radii of curvature;

said downwardly projecting deformities having bottoms and sides having intersections therebetween which form radii of curvature; and a polycrystalline material layer having a cutting surface and an opposed mounting surface, the mounting surface having deformities complementary to and in contact with the deformities of the support surface of the substrate, said mounting surface being joined to the said support surface.

13. A cutting element as in claim 12 wherein the downwardly projecting deformities of the substrate are channels having concave bottoms.

14. A cutting element as in claim 12 wherein each upwardly projecting deformity is adjacent at least one downwardly projecting deformity and a side of the upwardly projecting deformities is continuous with a side of each adjacent downwardly projecting deformity of the substrate, wherein said adjacent sides are curved.

15. A cutting element as in claim 14 wherein the deformities of the substrate are elongate and have concave bottoms.

* * * * *